April 16, 1963　　　　F. S. NICHOLS　　　　3,086,184
COIL STRUCTURE FOR ELECTROMAGNETIC INDUCTION APPARATUS
Filed March 26, 1957　　　　　　　　　　　　3 Sheets-Sheet 1

Inventor,
Frank S. Nichols,
by Gilbert P. Tarleton
His Attorney.

Inventor,
Frank S. Nichols,
by Gilbert P. Tarleton
His Attorney.

April 16, 1963   F. S. NICHOLS   3,086,184
COIL STRUCTURE FOR ELECTROMAGNETIC INDUCTION APPARATUS
Filed March 26, 1957   3 Sheets-Sheet 3

Inventor,
Frank S. Nichols,
by Gilbert P. Tarleton
His Attorney.

United States Patent Office 3,086,184
Patented Apr. 16, 1963

3,086,184
COIL STRUCTURE FOR ELECTROMAGNETIC INDUCTION APPARATUS
Frank S. Nichols, Pittsfield, Mass., assignor to General Electric Company, a corporation of New York
Filed Mar. 26, 1957, Ser. No. 648,639
1 Claim. (Cl. 336—60)

The present invention relates to electromagnetic induction apparatus, and more particularly to an improved electromagnetic induction coil construction especially adapted for use in commercial frequency power transformers.

As meant herein, an electromagnetic induction coil is a coil formed of an electrical conductor wound into a plurality of turns electrically insulated from each other and having starting and finish terminals spaced lengthwise on the electrical conductor for passing a current through the conductor and thereby producing a magnetic field extending axially through and linking the coil turns, or, conversely, for utilizing a voltage which will exist therebetween as a result of such a magnetic field inducing voltage in the turns of said conductor which are included between those terminals.

The broadly novel concept involved in the invention is the reversing of the conventional physical relationship of the conducting and insulating elements of an insulated conductor wound into adjacent turns to form an electrical coil. Conventionally, the insulation such as rubber, cotton, paper or enamel is outside of and entirely surrounds the conductor. This is wasteful of space and insulation and retards conduction of heat from the conductor. In this invention the conventional relationship is reversed or turned inside out by means of a sandwich construction in which a layer of insulation is placed between opposite conducting layers. The insulation is actually inside the split or divided conductor whose total cross-section can be the same or even less than for a conventional insulated conductor of equal current carrying capacity.

The conventional relationship is a carry-over from straight conductor practice where the conductor is entirely surrounded with insulation in order to "contain" the electricity in the conductor. It is therefore far from obvious that winding adjacent turns of a conductor-insulator-conductor sandwich would produce an operative coil because the conductor surfaces of adjacent physical turns would be in contact with each other and thus would appear to short circuit the turns. However, such an arrangement actually operates very well because there is no voltage difference between adjacent conductor surfaces, and actually it is the turns of the interface between adjacent conductor surfaces which constitutes the electrical turns of the coil. These are, of course, insulated from each other by the insulating filler of the sandwich.

This leads to numerous advantages. Thus, there is no potential stress or voltage gradient in the spaces between the physical turns and hence there can be no ionization or insulation failure in such spaces. Therefore, it is not necessary to fill the spaces with fluid insulation as is common in conventional high voltage practice and which leads to problems because of the difference in dielectric constant between the insulating fluid and the insulating solid in series. All the electrical stress is in the sandwich filler, which is "inside" the conductor so to speak. By bonding elements of the sandwitch together, which can easily be done during its manufacture in a continuous "straight line" process, all air, voids and pockets for ionization can easily be eliminated.

The invention is particularly well suited to foil-wound induction coils. By the term "foil-wound induction coil" is meant a coil of given axial length formed by flatwise winding on itself a suitably insulated ribbon or strip of low specific electrical resistance material whose width is substantially equal to the axial length of the coil and whose thickness corresponds to that of the foil form of the material, i.e., no more than a few mils, so that each turn of the ribbon or strip constitutes one complete layer of the coil.

The use of foil windings for transformers, particularly of the large commercial frequency high voltage power type, offers several advantages. A substantial reduction in the space occupied by the coils is afforded, and the core can also be made smaller, without sacrifice of the electrical capacity of the transformer. Furthermore, the foil configuration of a coil material facilitates winding and tap inserting procedures and lends itself more readily to mechanization of these operations, as compared to the more conventional wire coil arrangements.

Further advantages are greater mechanical strength to resist internal electromagnetic forces resulting from short circuit currents, particularly short circuits between taps, much more uniform inherent distribution of transient voltage stresses, such as lightning surges, throughout the winding as compared with conventional wire wound coils, and better heat dissipation.

In the forming of foil-wound coils of the above type heretofore, metal foil was usually interleaved with one or more sheets of insulating material, thus providing alternate conducting and insulating layers in the coil. In winding a coil of this construction, the entrapment of air or introduction of voids between the surfaces of the metal foil and insulation sheet is unavoidable, unless special vacuum, heat and oil treatments are employed. In operation of the coil at high voltage, especially in power transformers where impulse voltages as high as 1000 volts per turn may be encountered, any entrapped air will become ionized and corona will be produced, resulting in damage and ultimate destruction of the insulation.

It is an object of the present invention to provide an electromagnetic induction coil which overcomes the above disadvantages.

It is another object of the invention to provide an electromagnetic induction coil formed of a composite unitary insulated conductor means wherein the insulation is arranged between conducting elements.

It is a further object of the invention to provide electromagnetic induction apparatus, such as transformers, having foil-wound coils which have improved electrical properties, are easily and economically manufactured, and in particular facilitate the coil winding procedure.

With the above objects in view, the present invention provides an electromagnetic induction coil comprising a wound composite unitary member having an inner layer of insulation material and outer layers of conducting material on opposite sides of the inner insulation layer, the opposite conducting layers of adjacent turns of the wound member being in electrical contact with each other and jointly forming a composite coiled conductor, and starting and finish terminals connected to the composite coiled conductor at longitudinally separated points thereof.

In a preferred embodiment of the invention the coil is formed of a concentrically wound composite sheet member having a layer of insulation sandwiched between layers of conducting material such as aluminum foil.

The invention will be better understood from the following description taken in conjunction with the accompanying drawings, in which.

Figure 1:
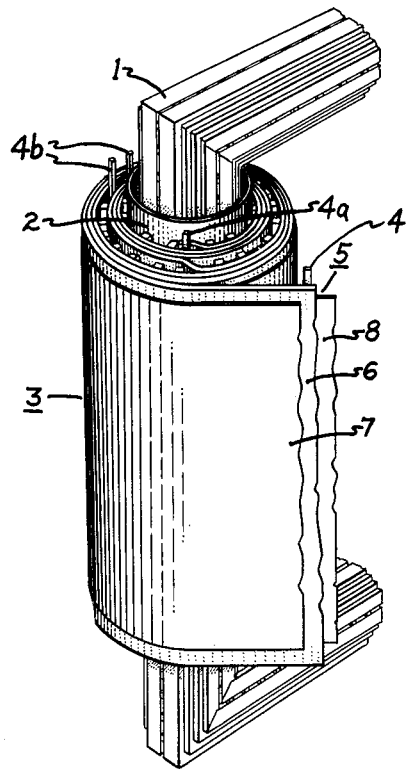
FIG. 1 is a fragmentary view of a transformer having a foil-wound coil formed in accordance with the present invention, the foil-wound coil being shown partially unrolled.

Referring now to the drawing, and particularly to FIG. 1, there is shown a transformer having a magnetic core 1 surrounded by a coil structure comprising a central cylinder 2 of suitable insulating material such as synthetic resin, having wrapped thereon a foil-wound coil 3 formed in accordance with the invention. Coil 3 is provided with starting and finish terminals 4 and 4a and tap leads 4b, all connected to the foil winding at desired points spaced along the length thereof and projecting axially from the end of the coil. The winding constituted by coil 3 may form either the primary or secondary winding of the transformer, the other winding being arranged either on a different leg of the transformer core 1 or placed over the first winding concentric therewith. The coil winding is shown in exaggerated scale in the drawings for purposes of clarity, and the relative dimensions of the parts as shown, including those of the terminals, taps and component layers of coil 3, are not necessarily those used in practice. In connection with the showing of terminal 4 in FIGS. 1 and 3, it will be understood that this terminal will contact both conductor 8 and the turn of conductor 7 facing it when coil 3 is fully rolled.

Coil 3 is formed in accordance with the invention of a composite unitary sheet 5 comprising an inner layer 6 of insulating material having outer layers 7 and 8 of conducting material superposed on opposite sides in intimate adherence thereto over their entire contacting surfaces. Inner layer 6 may be composed of any insulation material which is suitable for the temperature and voltage levels of the transformer. Polyethylene terephthalate films have been found particularly satisfactory for the purposes of the invention, although other insulation materials such as cellulose acetate, regenerated cellulose, polyvinyl alcohol, polystyrene and the like may be employed. Conducting layers 7 and 8 are preferably composed of aluminum, either in the form of a foil adhesively joined to layer 6 or of a metallized coating deposited on the insulation layer. Other types of conducting material or metals may be used instead of aluminum, and the opposite conducting layers may be of the same or different metals.

Instead of coating the inner insulation sheet with conducting material, the insulation layer in the form of a liquid enamel or the like may be coated on a metal foil, and a second metal foil or metal coating superposed or deposited on the exposed surface of the insulating coating, to thereby form the composite sheet of the present invention.

In forming a metallized coating on the inner insulation sheet 6, the metallic deposit may be made by any known method, such as vacuum evaporation, sputtering or spraying of the metal. Where metal foil sheets are applied to the insulation sheet, any suitable adhesive material can be used, care being taken that the foil and insulation sheets are in intimate contact with each other over their entire contacting surfaces. Where adhesive materials are used which require solvents, the solvent should be removed, e.g., by heating the sheet on which the adhesive is applied, before superimposing the foil and insulation sheets on each other, the superimposed sheets with adhesive therebetween then being laminated by suitable application of heat and pressure, all in accordance with well-known processes, to form a unitary lamination and to ensure complete removal of air from within the lamination. An example of an adhesive suitable for this type of application would be a solution of a butadiene-acrylonitrile type synthetic rubber with a phenol formaldehyde resin. Where the so-called solventless varnishes, as for instance a 100% reactive epoxy resin, are used as the adhesive media, the solvent removal procedure is, of course, unnecessary.

The composite sheet is preferably sufficiently thin and flexible to allow it to be readily wound into coil form with smooth tight windings and without causing cracking of the component layers. In general, the inner insulation film 6 will be of the order of 1 to 3 mils, and each metal layer 7, 8 in a high voltage coil will normally be of the order of ¾ to 3 mils, while in a low voltage coil each metal layer will be of the order of 5 to 15 mils. The thicknesses of the opposite conducting layers relative to each other and to the insulation layer can be varied as desired or necessary.

Figure 2:
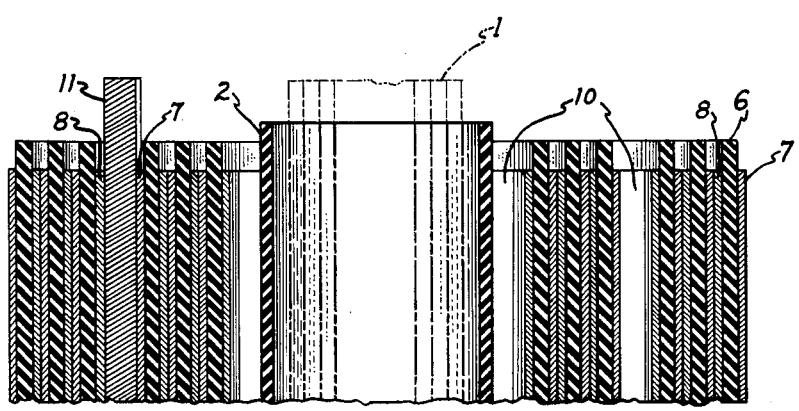
FIG. 2 is an enlarged detail view in section of a portion of a foil-wound coil similar to that in FIG. 1, the section being taken along the line 2—2 of FIG. 3.
Figure 3:
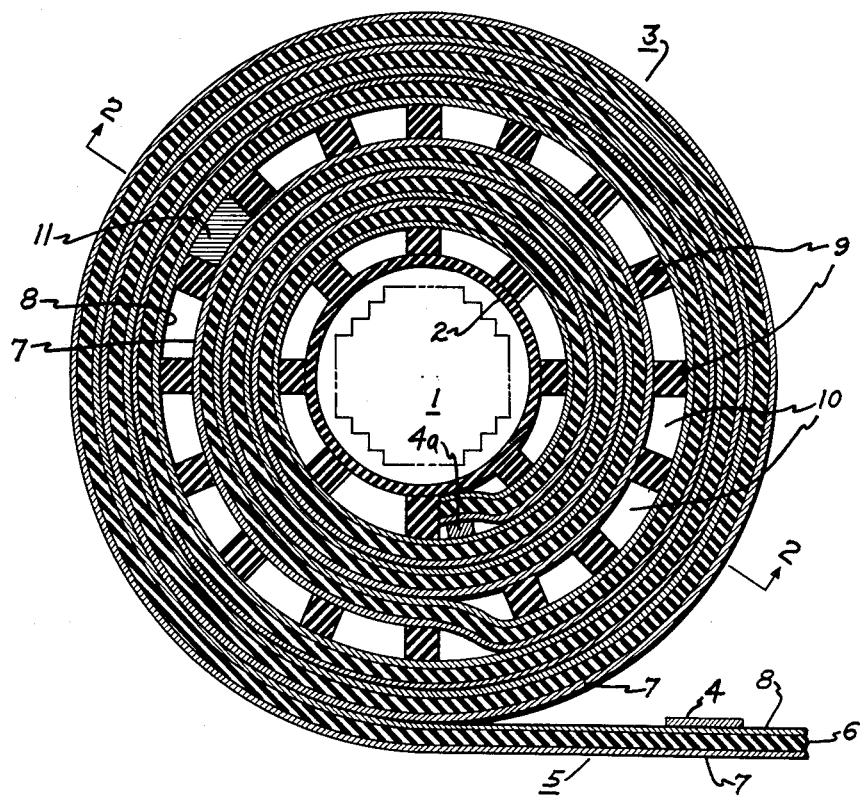
FIG. 3 is a sectional view of the foil-wound structure of FIG. 2 taken transverse the axis of the coil.

As shown in FIGS. 2 and 3, when the integral composite foil sheet 5 is wound in a coil of concentric turns, the opposite metal layers 7, 8 in adjacent turns come into electrical contact with each other to jointly form a composite coiled conductor extending around the coil. The insulation layer 6 being integrally joined in intimate adherence to outer metal layers 7, 8, no air gaps or voids can be introduced adjacent the insulation film during the winding process, as is likely in the case where separate sheets of foil and insulation are used, or even where a two-ply combined foil and insulation sheet is employed. Any air entrapped in winding the present composite sheet will be located between the contacting metal layers 7, 8 of adjacent turns, but since these layers are at the same potential in the transformer, no corona will be produced in these voids even under high voltage conditions.

As will be observed, the inner insulation layer 6 of the composite sheet is normally made wider than the outer metal foil layers 7, 8, so that the portion of layer 6 extending beyond the edges of metal layers 7, 8 serves as an insulating barrier to prevent corona or arcing between the edges of the metal layers. Where the metal layers are formed by metallizing procedures, suitable masking of the margins of the insulating base layer will provide the desired width of the metal layers. Alternatively, especially in the case where it is more economical to make the composite metallized sheet of rather large width and then cut it into desired narrower widths, the metallizing can be provided over the entire surface of the sheet and in the finally cut narrow strip the metallic layers can be removed to the extent desired along the opposite margins by suitable etching solutions.

In the foil-wound structure, channels are provided extending axially within the coil for the circulation of cooling media, such as oil or air, during the operation of the transformer. To form the cooling channels, transverse elongated spacer members 9 (see FIG. 3) are inserted at intervals between certain turns in the coil winding to define cooling ducts 10 extending through the coil. In this connection, the invention provides a further notable advantage in that the metal layers forming opposite sides of the duct space 10 are at equal potential and there is, therefore, no electrical stress across the duct.

Certain of the ducts 10 may be utilized for receiving tap leads attached at desired points in the coil winding, and in FIGS. 2 and 3 there is shown tape lead 11 arranged in and projecting axially from duct 10. As shown, tap 11 is preferably thick enough to electrically contact both metal layers 7, 8 on opposite sides of duct 10. In practice tap member 11 is normally welded or otherwise secured prior to winding to the composite sheet 5 in electrical connection with one of the metal layers. In addition to the good electrical connection thus provided by the double contact of lead 11 with conductors 7, 8, a further advantage of the illustrated lead and foil arrangement is that the sharp-cornered tap lead is separated on both sides by the foil layers from the insulation film. The tap member thus need not be provided with an additional insulating covering to avoid damage to the insulation film as would be the case in conventional foil-wound structures having alternating foil and insulating layers. The absence of electrical stress in duct space 10, as mentioned above, also makes possible such elemination of the usual insulation covering for the tap.

Other forms of tap elements may be used instead of the bar-type lead 11 shown. The taps may comprise, for example, foil strips lying between adjoining metal layers in the wound coil instead of in the duct spaces, the foil tap leads being either joined directly to one or both metal layers or held in electrical contact therewith by the pressure of the coil turns. In the latter arrangement, the portion of the foil tap lying within the coil is preferably of enlarged area to ensure adequate electrical contact with the conducting coil layers.

While the invention is particularly advantageous as applied to coils formed of insulated foil sheets as above described, it is also applicable to other forms of coil conductors, such as the rectangular wire coils shown in FIGS. 4–7.

Figure 4:
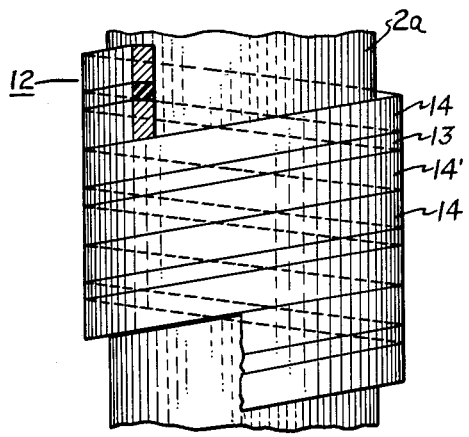
FIG. 4 is an elevation view of a different form of the invention as embodied in a helically wound composite wire coil.
Figure 5:
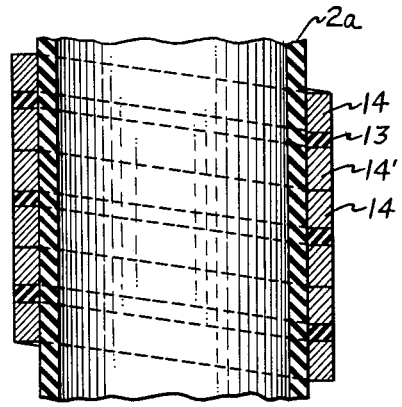
FIG. 5 is a cross-sectional view of the FIG. 4 arrangement.

In FIGS. 4 and 5 a rectangular composite wire 12 composed of a sandwich of insulation 13 between the edges of flat metal strips 14, 14' is shown helically wound on a central insulating cylinder 2a with the metal strips of adjacent turns in contact with each other to jointly form the composite conductor of the coil. Using this arrangement, layers of the helical winding can be superposed on each other (not shown) with insulating material such as paper sheets separating the layers, as will be understood by those skilled in the art.

Figure 6:
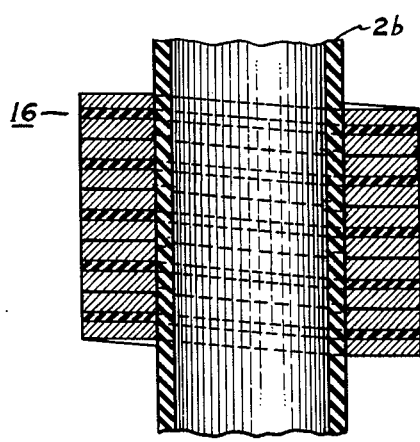
FIG. 6 shows an arrangement similar to that of FIGS. 4 and 5, wherein the composite wire has a different shape and is wound edgewise rather than flatwise.

The FIG. 6 arrangement is similar to that of FIGS. 4 and 5, except that the composite wire 16 in this case is formed of a flatwise lamination of insulation material 17 arranged between the flat surfaces of metal strips 18, 18', the wire 16 being wound edgewise on insulating cylinder 2b.

Figure 7:
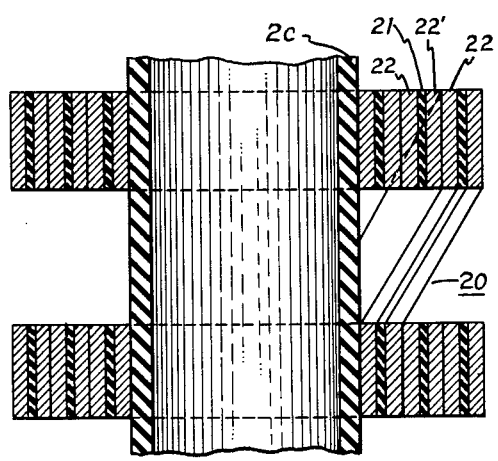
FIG. 7 shows still another embodiment of the invention wherein the composite wire is wound in concentric layers to form so-called pancake coils.

FIG. 7 shows an arrangement of a rectangular composite wire 20 in a series of axially separated so-called "pancake" or disk coils wound on cylinder 2c wherein a composite wire 20 composed of insulation 21 and metal strips 22, 22' in concentrically wound in a plurality of layers with the metal strips 22, 22' in electrical contact with each other to form a composite coiled conductor.

By virtue of the present invention there is provided an electromagnetic induction coil which is inherently free of insulation voids and therefore does not require thorough impregnation with a dielectric liquid as is necessary in the usual coil constructions. Transformers incorporating the present invention may be either of the dry type or liquid-filled type. In tightly wound coils such as are used for foil-wound transformers, it is especially difficult to ensure proper impregnation of the insulating turns with dielectric liquid to fill the voids therein, and since the composite foil arrangement of the present invention dispenses with the need for any liquid impregnation, this difficulty is entirely overcome.

While the present invention has been described with reference to particular embodiments thereof, it will be understood that numerous modifications may be made by those skilled in the art without actually departing from the scope of the invention. Therefore, the appended claim is intended to cover all such equivalent variations as come within the true spirit and scope of the invention.

What I claim as new and desire to secure by Letters Patent of the United States is:

Transformer apparatus comprising core means, tubular insulating means surrounding said core means, a foil-wound coil wrapped around said tubular insulating means, said foil-wound coil being formed of a concentrically wound composite unitary sheet member comprising an inner layer of insulation material and outer layers of metal on opposite surfaces of said inner layer in intimate contact therewith, the inner insulating layer extending beyond said outer metal layers axially of said coil, the opposite metal layers of adjacent turns of said wound sheet member being in electrical contact with each other and jointly forming a composite coiled conductor, means forming ducts extending axially through said coil between certain adjacent turns of said composite unitary sheet member for circulation of cooling media through said coil, and elongated tap means arranged in and projecting from at least one of said ducts in electrical contact with the metal layers on the opposite sides of said duct.

References Cited in the file of this patent

UNITED STATES PATENTS

| | | |
|---|---|---|
| 1,870,949 | Dubilier | Aug. 9, 1932 |
| 2,000,441 | Given | May 7, 1935 |
| 2,470,826 | McMahon | May 24, 1949 |
| 2,544,845 | Link | Mar. 13, 1951 |
| 2,659,845 | Calvert | Nov. 17, 1953 |
| 2,761,094 | Frampton | Aug. 28, 1956 |

FOREIGN PATENTS

| | | |
|---|---|---|
| 666,731 | Great Britain | Feb. 20, 1952 |